United States Patent
Li et al.

(10) Patent No.: US 7,164,590 B2
(45) Date of Patent: Jan. 16, 2007

(54) POWER TRANSFER SYSTEM WITH REDUCED COMPONENT RATINGS

(75) Inventors: Yong Li, Torrence, CA (US); Toshio Takahashi, Rancho Palos Verdes, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 10/628,501

(22) Filed: Jul. 28, 2003

(65) Prior Publication Data

US 2004/0095789 A1 May 20, 2004

Related U.S. Application Data

(60) Provisional application No. 60/399,747, filed on Jul. 29, 2002.

(51) Int. Cl.
*H02M 3/335* (2006.01)
(52) U.S. Cl. .......................... 363/40; 363/95
(58) Field of Classification Search .................. 363/34, 363/78, 84, 89, 127, 40, 95
See application file for complete search history.

(56) References Cited

U.S. PATENT DOCUMENTS

| | | | | |
|---|---|---|---|---|
| 4,777,581 A | 10/1988 | Smith | ......................... | 363/161 |
| 5,019,717 A | 5/1991 | McCurry et al. | ............. | 307/66 |
| 5,063,490 A * | 11/1991 | Maehara et al. | ............... | 363/37 |
| 5,099,918 A | 3/1992 | Bridges et al. | ................ | 166/60 |
| 5,184,025 A | 2/1993 | McCurry et al. | ............. | 307/66 |
| 5,220,492 A | 6/1993 | Rubin et al. | ................... | 363/97 |
| 5,438,502 A * | 8/1995 | Rozman et al. | ................ | 363/35 |
| 5,465,011 A * | 11/1995 | Miller et al. | ..................... | 307/64 |
| 5,502,630 A | 3/1996 | Rokhvarg | ..................... | 363/84 |
| 5,642,270 A | 6/1997 | Green et al. | .................... | 363/17 |
| 5,739,664 A | 4/1998 | Deng et al. | .................... | 318/808 |
| 5,847,944 A | 12/1998 | Jang et al. | ..................... | 363/44 |
| 5,889,659 A | 3/1999 | Emmerich | ..................... | 363/34 |
| 6,005,784 A | 12/1999 | Ikeshita | ........................ | 363/37 |
| 6,031,749 A | 2/2000 | Covington et al. | ............ | 363/98 |
| 6,057,652 A | 5/2000 | Chen et al. | ...................... | 315/307 |
| 6,229,719 B1 | 5/2001 | Sakai et al. | ..................... | 363/37 |
| 6,275,018 B1 | 8/2001 | Telefus et al. | ................. | 323/282 |
| 6,275,397 B1 * | 8/2001 | McClain | ........................ | 363/89 |
| 6,288,921 B1 | 9/2001 | Uchino et al. | ................ | 363/132 |
| 6,301,137 B1 | 10/2001 | Li | ................................ | 363/98 |
| 6,337,801 B1 | 1/2002 | Li et al. | ......................... | 363/127 |
| 6,370,039 B1 | 4/2002 | Telefus | .......................... | 363/15 |
| 6,381,159 B1 | 4/2002 | Oknaian et al. | ................ | 363/98 |
| 6,492,788 B1 | 12/2002 | Agirman et al. | ............ | 318/700 |
| 6,531,843 B1 | 3/2003 | Iwaji et al. | ................... | 318/727 |
| 6,850,426 B1 * | 2/2005 | Kojori et al. | ................. | 363/123 |
| 2002/0080633 A1 | 6/2002 | Kang | ............................ | 363/71 |

*Primary Examiner*—Adolf Berhane
(74) *Attorney, Agent, or Firm*—Ostrolenk, Faber, Gerb & Soffen, LLP

(57) ABSTRACT

A power inverter control adjusts input power to track with output power to reduce energy handling requirements for an inverter DC bus. Input power to the power inverter circuit is measured and compared with a measurement of inverter output power. The comparison result is applied to a power factor correction circuit to adjust input power to track with output power, while obtaining a good power factor for the power inverter circuit. The energy requirements and ripple voltages or ripple currents on the DC bus are reduced, leading to a reduction in rating specifications for passive energy storage elements on the DC bus.

19 Claims, 2 Drawing Sheets

POWER TRANSFER SYSTEM WITH REDUCED COMPONENT RATINGS

RELATED APPLICATIONS

The present application is based on and claims benefit of U.S. Provisional Application Serial No. 60/399,747, filed Jul. 29, 2002, entitled POWER INVERTER WITH REDUCED ENERGY CAPACITY, to which a claim of priority is hereby made.

BACKGROUND OF THE INVENTION

1. Field of the Invention

The present invention relates generally to energy transfer devices, and relates more particularly to power inverter circuits with reduced component rating.

2. Description of Related Art

Typical power systems for transferring energy between an input and an output often employ a power inverter that has a DC input and a switched output that can be single or multiple phase. For example, referring to FIG. 1, an inverter for driving a three phase motor M is illustrated generally as inverter 10. Inverter 10 operates by switching the power supplied by the plus and minus DC bus lines into motor lines U, V and W to operate motor M. Switches 12a–12f are switched on and off to appropriately direct power to and from motor M in dependency upon the desired power output, control scheme, available DC bus power and other parameters that factor into obtaining a high performance motor drive. Each pair of switches connected between a +DCBUS line and a −DCBUS line form a switching half bridge for delivering power to motor lines U, V and W. For example, switches 12a and 12b form a switching half bridge to drive power signals on motor line U.

Operation of the half bridge formed by switches 12a–12b is accomplished through standard switching practices to avoid problems associated with component limitations such as switching losses, and to improve system performance. Accordingly, switches 12a and 12b are never switched on at the same time to avoid current shoot through in the motor drive. In addition, a dead time is provided between switching intervals when both switches in the half bridge change state. For example, if switch 12a is to be turned off and switch 12b is to be turned on, these events do not occur simultaneously, but with a delay between switch 12a turning off and switch 12b turning on. When a high frequency inverter drive is used for high performance motor control, the dead time delay becomes important to improve switching frequency without incurring the above discussed drawbacks.

High frequency switching also produces rapid changes in power transferred from the inverter to the motor and vice versa. These rapid changes in transferred power implies the need of higher power ratings for the switches in the inverter, for example, to handle the potentially large range of power fluctuations.

Similarly, other components coupled to the inverter, such as passive energy storage components, are rated to withstand potentially large power fluctuations including high peak currents and voltages and large ripple currents and voltages. Referring to FIGS. 2A and 2B, a passive electrical energy storage component is coupled to inverter 10 to both store input energy, and supply stored energy through inverter 10. FIG. 2A shows storage capacitor $C_{BUS}$ coupled between the DC bus lines input to power inverter 10, while FIG. 2B shows inductor $L_i$ in the positive DC bus line connected to power inverter 10. In FIG. 2A, capacitor $C_{BUS}$ stores electrical energy for power inverter 10 acting as a voltage source inverter, while inductor $L_i$ in FIG. 2B acts as a DC link inductor for power inverter 10 acting as a current source inverter. Due to the difficulties associated with energy transfer in power inverter 10 discussed above, the power ratings for the storage components $C_{BUS}$ and $L_i$ must be selected to be high enough to handle the fluctuations in power without saturating or damaging the passive energy storage components.

When selecting appropriately rated passive components for use with power inverter 10, the components with appropriate ratings are typically large and somewhat expensive. For example, a typical bus capacitor $C_{BUS}$ comprises a large percentage of a motor drive size and cost. It would be desirable to reduce the rating, and thus the size and cost, of the passive components used with a typical motor drive system.

SUMMARY OF THE INVENTION

In accordance with the present invention, the inventors have found that the main purpose for including the passive components in the energy transfer circuits for power inverters is to absorb or deliver the difference between the instantaneous input power of the inverter and output power that is applied to a load. The output power applied to the load can be delivered to a motor or a power supply load. When the instantaneous input power tracks with the instantaneous output power, the difference between the instantaneous input power and instantaneous output power can be minimized. Accordingly, the energy to be stored or delivered by the passive component, such as a bus capacitor or DC link inductor can be minimized. For example, the DC bus ripple voltage can be minimized, as well as the DC link ripple current. By determining a particular voltage or current ripple level that can be tolerated by the specific application, the size of the DC bus capacitor or DC link inductor can be minimized accordingly.

The present invention provides a front end active control for supplying power to the DC bus connected to the power inverter. The front end active control includes a power converter with power factor correction (PFC) to make the power transfer system appear as a purely resistive load to the input power lines. The PFC power converter controls the instantaneous input power to minimize the difference between the instantaneous input power and the instantaneous output power, thereby reducing the requirements for passive components coupled to the DC bus. The instantaneous output power can be measured or calculated by obtaining values for parameters such as output current or voltage. Typically, one or more of these parameters are measured in most power transfer systems, in particular in motor drive systems, where high performance depends upon closed loop feedback with sensed parameters.

By reducing the variations in ripple current or voltage and instantaneous input and output power, the rated passive components can be specified at a much lower value, thereby providing reduced packaging size and realizing direct cost reduction.

BRIEF DESCRIPTION OF THE DRAWINGS

The present invention is described in detail below with reference to the accompanying drawings, in which.

DETAILED DESCRIPTION OF THE PREFERRED EMBODIMENTS

Figure 1:
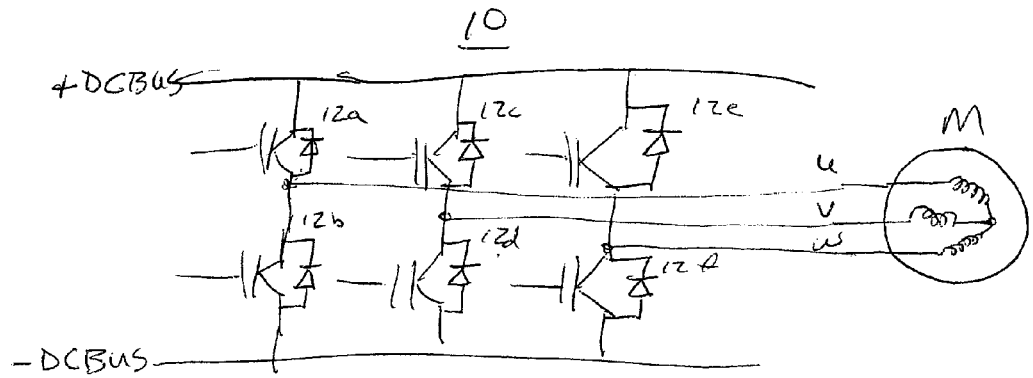
FIG. 1 is a circuit diagram of a power inverter coupled to a motor.
Figure 2A:
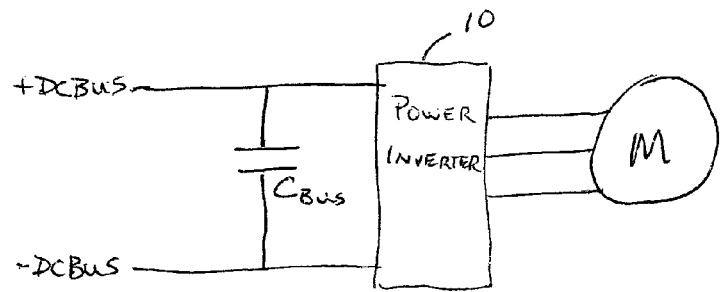
FIGS. 2A–2B is a circuit block diagram of a motor drive showing a voltage source inverter and current source inverter, respectively.
Figure 2B:
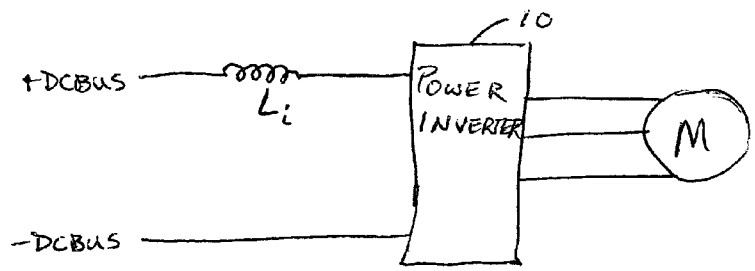
Figure 3:
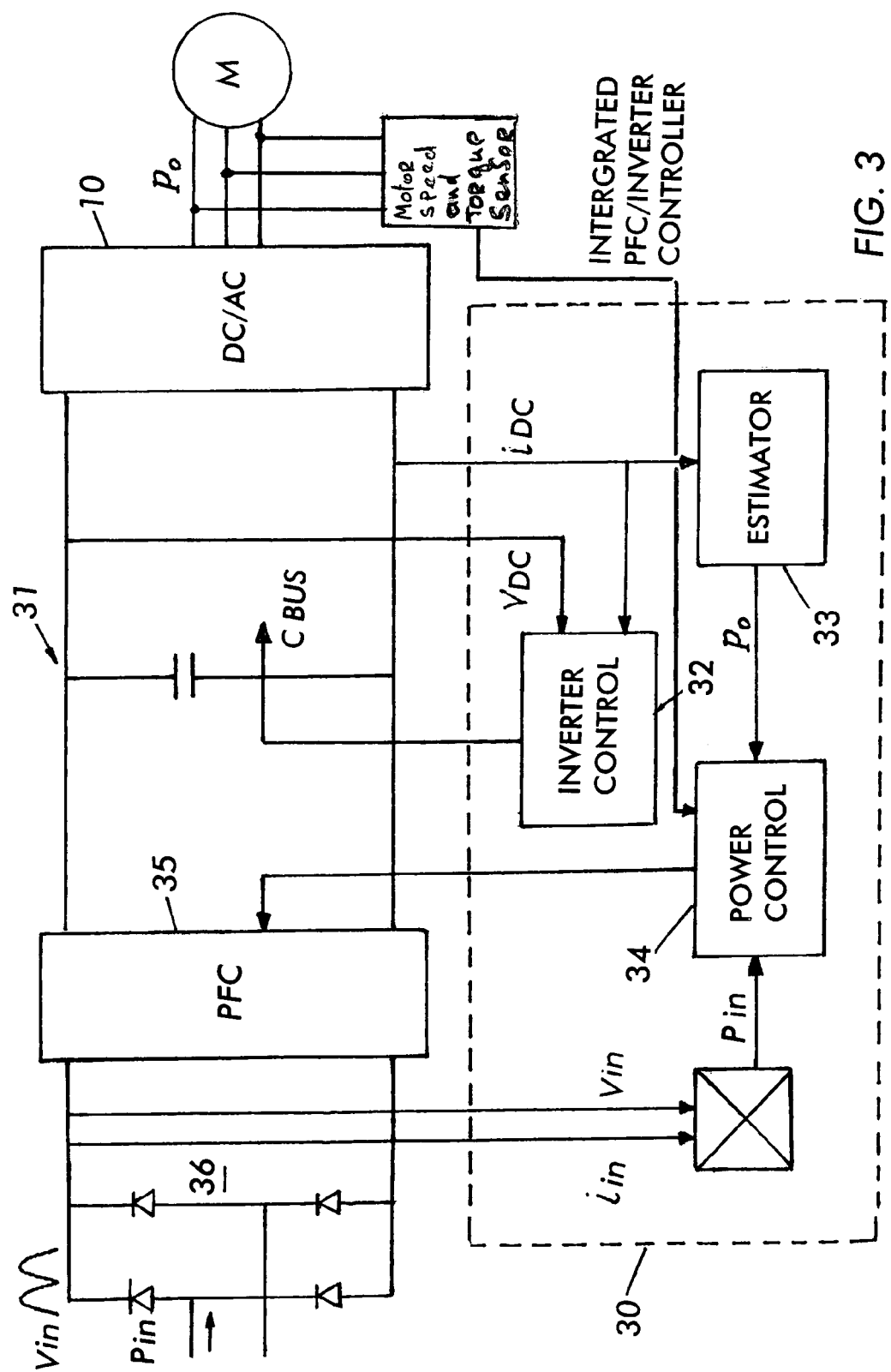
FIG. 3 is a circuit block diagram according to the present invention.

Referring now to FIG. 3, a control 30 for a motor drive system 31 is shown. Control 30 includes an inverter control 32, and estimator 33 and a power control 34. Inverter control 32 is a closed loop control for inverter 10, using as feedback signals the bus voltage $V_{DC}$ and the bus current $I_{DC}$. Inverter control 32 provides signals for switching the power switches in inverter 10 according to an appropriate profile to obtain a desired control output for motor M. For example, motor M can be operated for torque control or velocity control based on the switching signals obtained from inverter control 32 in conjunction with the bus feedback signals $V_{DC}$ and $I_{DC}$. Inverter control 32 can also contribute to realizing soft switching, or switching with zero current, to avoid switching losses. It should be apparent, that inverter control 32 can provide switching signals to operate inverter 10 as a single or multiple phase power supply. Power inverter 10 in motor drive system 31 is a voltage source inverter, due to the presence of bus capacitor $C_{BUS}$. Capacitor $C_{BUS}$ stores energy from power factor correction (PFC) power supply 35 and supplies energy to inverter 10 to drive output signals conditioned by operation of the power switches in inverter 10. Accordingly, capacitor $C_{BUS}$ is charging and discharging during operation of motor drive system 31, depending upon the conditions of the bus voltage and the amount of energy stored in capacitor $C_{BUS}$.

PFC power converter 35 switches power on the DC bus to provide an efficient power conversion of the full wave rectified input signal for use by power inverter 10, while drawing a sinusoidal current that in phase with the input AC voltage to obtain a high power factor. Accordingly, motor drive system 31 appears as a resistive load to the AC input lines coupled to a full wave rectifier 36. Instantaneous input power can easily be measured on the output of full wave rectifier 36 with a simple calculation involving input voltage $V_{in}$ and input current $I_{in}$. As illustrated in FIG. 3, signals representing input current $I_{in}$ and input voltage $V_{in}$ are multiplied together to produce a signal representative of $P_{in}$, which in turn is applied to power control 34. Power control 34 also receives an estimate of instantaneous output power from estimator 33, based upon measured bus current IDC.

Power control 34 receives the signals representative of input power $P_{in}$ and inverter output power $P_O$ and provides bus regulation and control command to PFC power converter 35 to drive the DC bus voltage so that instantaneous input power $P_{in}$ tracks with instantaneous output power $P_O$. By tracking input power $P_{in}$ with output power $P_O$, PFC power converter 35 controls the energy on the DC bus that bus capacitor $C_{BUS}$ must handle. With this criteria, the energy, $E_c$, in bus capacitor $C_{BUS}$, is minimized.

Input voltage $V_{in}$ and input current $I_{in}$ are normally measured to obtain a closed loop control for PFC power converter 35 to obtain a good power factor. Accordingly, input signals representative of input current $I_{in}$ and input voltage $V_{in}$ are typically available in motor drive system 31. In addition, it is often the case that motor speed and/or torque are directly measured with a sensing device. In this instance, estimator 33 is not necessary to obtain a signal representative of output power $P_O$. That is, directly measured motor speed and torque provide appropriate signals to formulate a signal representative of output power $P_O$. Because motor speed and torque are typical measurements made in motor drive system 31, control 30 can be further simplified.

The present invention provides a simple technique to reduce the rating requirements of passive components used in conjunction with inverter power transfer systems. Whether the passive component is a bus capacitor for a voltage source inverter, or a DC link inductor for a current source inverter, the present invention reduces the maximum ratings required for the components. The reduction in component rating requirements greatly reduces the size of the motor drive system, and also greatly reduces overall costs, as the required passive components represent a large percentage of the system cost and size. The PFC power converter operation changes only slightly to ensure input power tracks with output power while also drawing a sinusoidal input current in phase with the input voltage. The DC bus ripple voltage or DC link ripple current is minimized to produce a lower ripple requirement for the passive component. In addition, the energy handled by the passive component is minimized based on the application, again providing for a reduced rating for the passive component.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A power delivery system comprising:
an input power conditioning circuit for switching input power to obtain a desired power condition;
a DC bus coupled to the power conditioning circuit for transferring DC power supplied by the power conditioning circuit;
a power control circuit coupled to the power conditioning circuit for controlling input power drawn by the power conditioning circuit;
a first circuit for delivering an input signal indicative of input power to the power control circuit;
a second circuit coupled to the DC bus for delivering an output signal indicative of output power to the power control circuit; and
a power inverter coupled to the DC bus for providing a switched power output, wherein: the power control circuit operable to control the power conditioning circuit such that input power tracks with output power, and the power output signal indicative of output power is obtained based on direct measurements of speed and torque of a motor coupled to the power inverter.

2. A controller for an electrical power delivery system which provides controlled power to a load, the power delivery system including a DC link having a rectification circuit for converting incoming AC power to DC power, a switched inverter for generating controlled AC power from the DC power, and an energy storage unit in the DC link coupling the rectification circuit and the inverter, the controller comprising:
an input power conditioning unit adapted for connection to an output of the rectification circuit;
a power control unit coupled to the power conditioning unit for controlling the power drawn by the power conditioning unit;

a first sensor unit operative to provide a signal indicative of the DC power drawn by the power conditioning unit by sensing a voltage and current at the output of the rectification circuit; and a second sensor unit operative to provide a signal indicative of output AC power delivered to the load by sensing the DC link voltage and current;

wherein the power control unit is operable in response to the signals from the first and second sensor units to control the power conditioning unit to minimize the difference between the DC power drawn by the input power conditioning unit and the AC power delivered to the load, whereby the capacity of the energy storage unit is minimized.

3. A power delivery system including the controller according to claim 2, further comprising:

a power output unit which is adapted to provide power to the load; and a DC bus coupled to the power conditioning unit for transferring DC power supplied by the power conditioning unit to the power output unit.

4. The power delivery system according to claim 3, wherein the controller comprises an integrated circuit.

5. The power delivery system according to claim 3, wherein the second sensor unit comprises an estimator circuit coupled to the DC bus and operable to provide the signal indicative of output power based on measurements obtained from the DC bus.

6. A power delivery system according to claim 3, wherein the power output unit comprises a power inverter coupled to the DC bus for providing a switched power output to the load.

7. The power delivery system according to claim 6; wherein:

the energy storage unit comprises a bus capacitor coupled to an input of the power inverter; and the power rating of the bus capacitor is minimized relative to the power capacity of the system.

8. The power delivery system according to claim 6; wherein:

the energy storage unit comprises an inductor which couples the DC bus to an input of the power inverter, wherein the power rating of the inductor is minimized relative to the power capacity of the system.

9. The power delivery system according to claim 6, wherein the signal provided by the second sensor unit is obtained based on direct measurements of speed and torque of a motor coupled to the power inverter.

10. The controller according to claim 2, wherein the power conditioning unit comprises a power factor correction circuit.

11. The controller according to claim 2, wherein the first sensor receives an input current signal indicative of input current provided to the power conditioning unit, and an input voltage signal indicative of voltage supplied to the power conditioning unit.

12. The controller according to claim 11, wherein the DC power signal provided by the first sensor is obtained through multiplication of signals representing the input current and the input voltage.

13. The controller according to claim 2, wherein the load to be driven is a motor, and the signal provided by the second sensor unit is obtained based on direct measurements of speed and torque of the motor.

14. The controller according to claim 3, wherein the power conditioning unit includes a power factor correction unit.

15. An integrated circuit comprising the controller according to claim 2.

16. A method for controlling power delivered to a load by a power delivery system including a DC link having a rectification circuit for converting incoming AC power to DC power, a switched inverter for generating controlled AC power from the DC power, and an energy storage unit in the DC link coupling the rectification circuit and the inverter, the method comprising the steps of:

obtaining an indication of input power drawn by the power delivery system from a power source from measurement of the current and voltage at the rectification circuit by sensing a voltage and current at the output of the rectification circuit;

obtaining an indication of output power delivered to the load by sensing the DC link voltage and current;

controlling a power conversion unit coupled to the input power source to minimize the difference between the input power drawn from the source and the output power delivered to the load, based on the indications of the input and output power.

17. The method according to claim 16, wherein the output power indication is derived from measurements of at least one of a torque and velocity of a motor load.

18. A method for minimizing power rating for a passive component in a power delivery system comprising a rectification circuit coupled to an alternating current power source, a power conversion unit coupled to an output of the rectification circuit, an output of the power conversion unit coupled to a DC link to which the passive component is connected, further comprising a DC-AC inverter having an input connected to the DC link and an output providing output power, the method comprising:

obtaining an indication of input power drawn by the power delivery system from the alternating current power source by sensing a voltage and current at an output of the rectification circuit;

obtaining an indication of the output power supplied by the power delivery system by sensing the DC link voltage and current; and controlling the power conversion unit to minimize the difference between the input power drawn from the power source and the output power based on the indications of the input and output power.

19. The method according to claim 18, wherein the output power indication is derived from measurements of at least one of a torque and velocity of a motor load.

* * * * *